(No Model.) 2 Sheets—Sheet 1.

W. R. FEE.
WOOD SPLIT PULLEY.

No. 393,327. Patented Nov. 20, 1888.

Witnesses:

Inventor:
William R. Fee.
By his Attorney.

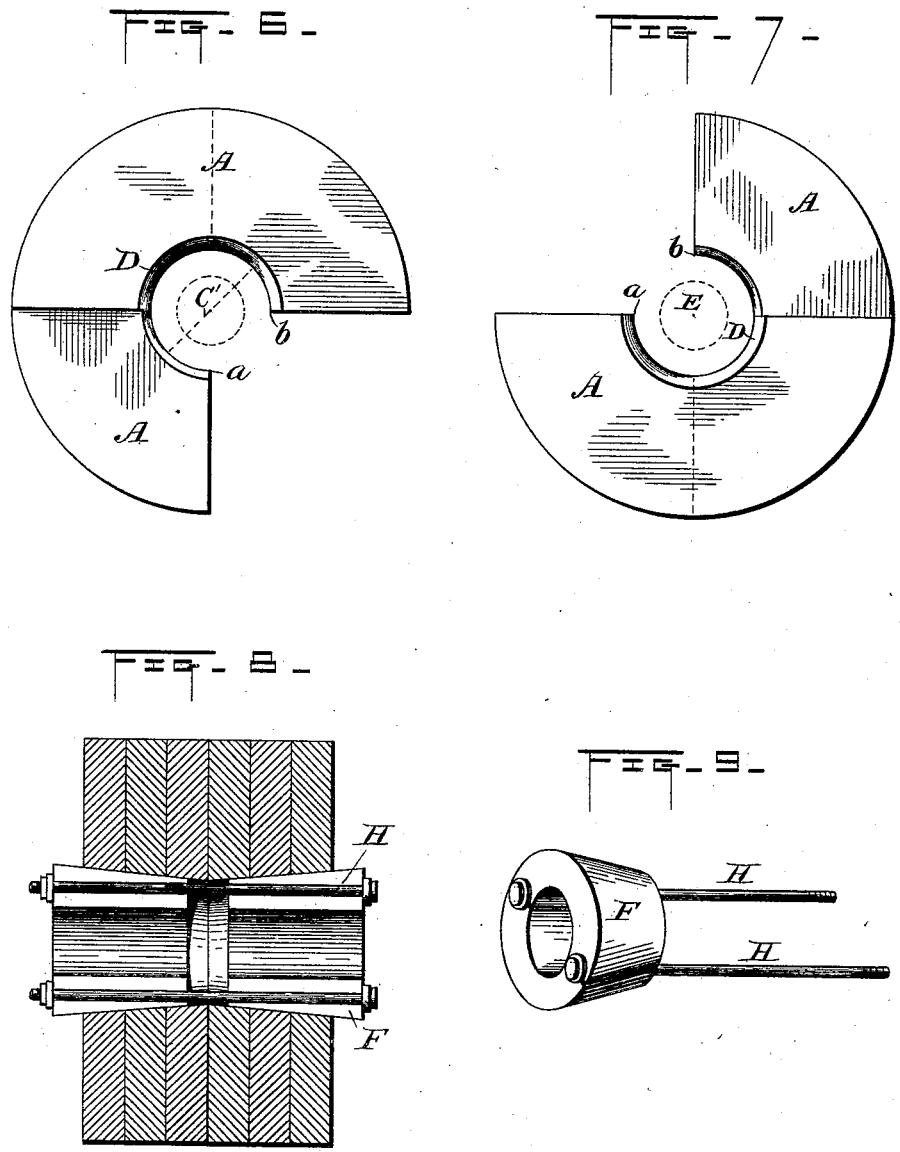

UNITED STATES PATENT OFFICE.

WILLIAM R. FEE, OF CINCINNATI, OHIO, ASSIGNOR TO HENRY MALEY, HENRY C. BAILEY, AND GUILFORD E. MAYFIELD, OF EDINBURG, INDIANA.

WOOD SPLIT PULLEY.

SPECIFICATION forming part of Letters Patent No. 393,327, dated November 20, 1888.

Application filed March 5, 1888. Serial No. 266,158. (No model.)

*To all whom it may concern:*

Be it known that I, WILLIAM R. FEE, of Cincinnati, in the county of Hamilton and State of Ohio, have invented a new and useful Improvement in Wood Split Pulleys, (Case C,) which improvement is fully set forth in the following specification and accompanying drawings, in which—

Figure 1:
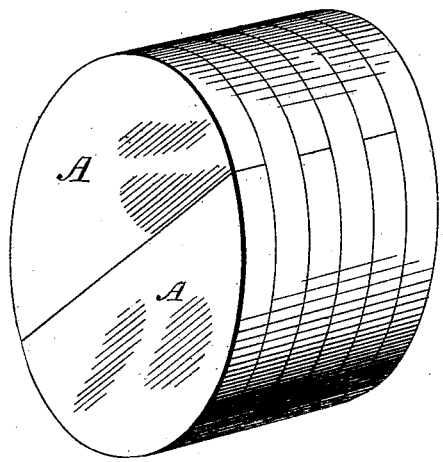
Figure 2:
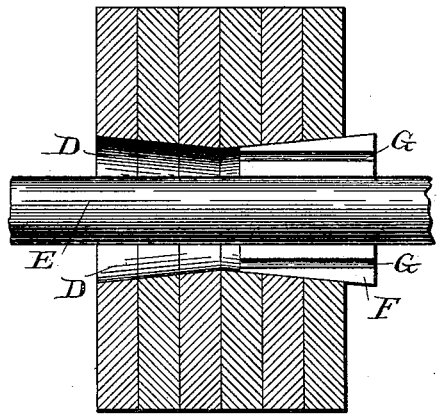
Figure 3:
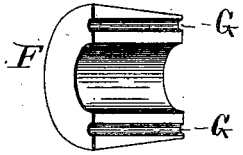
Figure 4:
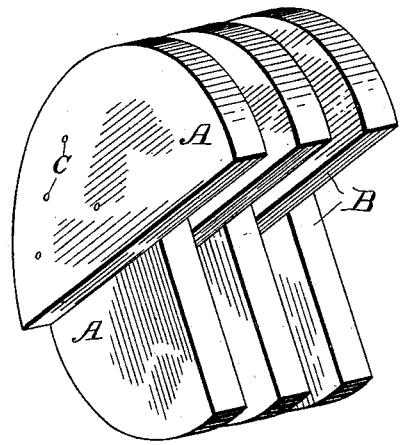
Figure 5:
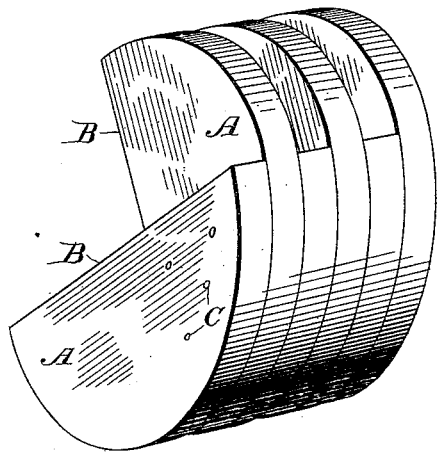

Figure 1 is a perspective view of my improved wood split pulley preparatory to boring same. Fig. 2 is a sectional view of the same bored and partially secured to a shaft; Fig. 3, a perspective view of portion of a tapering bush; Figs. 4 and 5, views of the parts forming the pulley, Fig. 1, detached; Figs. 6 and 7, side views of Fig. 1, showing the tapering bore; Fig. 8, a sectional view of the pulley with the tapering split bush and the bolts attached, and Fig. 9 a perspective view of the tapering bush and bolts.

The object of this invention is to construct a small wood split pulley, so arranged that it can be attached to a shaft of any diameter and detached without taking down the line-shafting, and to provide for securing the pulley rigidly to the shaft.

It consists in the manner of constructing the pulley, as will now be described, and set forth in the claims.

In wooden pulleys of small diameter it has always been a difficult task to provide means for securing the same rigidly to the shaft, and this task became still more difficult in case they are made in two parts, known as "split pulleys." Wooden split pulleys of less than fourteen or sixteen inches in diameter, where they have cross-arms and clamping-bolts, provide but little room between the arms and rim for manipulating the nuts on the clamping or tightening bolts, and I therefore construct my pulleys solid, but in two parts, and these two parts or sections are so arranged that when placed together on a shaft and a tapering bush is driven in at each end the bush will bind together the two sections and also firmly clamp the shaft, as will now be set forth.

In the drawings, A, Figs. 4 and 5, represents half-segments or semicircular pieces having one straight edge, B. Two of these with their straight edges placed together form a disk of the diameter of the pulley. In building up the pulley, however, it is desirable to make it in two parts, so that it can be separated, placed over the shaft, and secured there. I therefore commence by lapping together these half-segments, so that their inner straight edges, B, cross each other centrally at right angles. As each half-section is the counterpart of the other, they will fit together and form the pulley shown in Fig. 1. It should be observed that in building the lapped parts are glued and nailed, as shown at C, Figs. 4 and 5. After the pulley is thus built up and placed together it is centrally bored, and the bore at each end is made flaring, as shown at D, Fig. 2. In Figs. 6 and 7 the effect of this flaring bore is observed. The space between the points $a\ b$ is shown as being smaller than the smallest diameter of the bore along the line C'. It will thus be seen that a pulley made in that manner and bored will not receive a shaft as large as the bore. The space between the shaft E and the bore D is filled by means of the tapering split bush F. Along each split side of the bush F is a groove, G, which grooves form holes for the bolts H when the bush-sections are placed together, as shown in Fig. 9.

In attaching the pulley to the shaft the sections are taken apart and placed together on the shaft. The split bushings F are then placed on the shaft at each side of the pulley and driven into the flaring bore, after which the bolts H are placed through the holes in the bush and tightened or clamped by the nuts. No other means are necessary to clasp the pulley to the shaft, as the projecting ends of the lapped segments, as shown by the side views, Figs. 6 and 7, lock against the bush and prevent the two parts of the pulley from being forced apart. At the same time the flare of the bore and the taper of the bushing cause the latter to press tightly against the shaft as they are forced in.

It should be stated that in manufacturing the pulley the bore is first made in the pulley before the periphery is turned off, thereby assuring a perfect balance.

Any kind of suitable wood may be used, although I prefer hard wood, as it makes a finer finish and will resist a greater pressure on the part of the tightening-bolts.

What I claim as new is—

1. In a wood split pulley, two similar independent sections or parts, each part of which is formed by lapping together half-segments or semicircular pieces with their straight edges crossing each other centrally at right angles, substantially as herein set forth.

2. In a wood split pulley, two similar independent sections or parts, each part of which is formed by lapping together half-segments or semicircular pieces with their straight edges crossing each other centrally at right angles and having a central bore flaring at each end, substantially as herein set forth.

3. A wood split pulley built up of two similar independent sections or parts, each part of which is formed by lapping together half-segments or semicircular pieces with their straight edges crossing each other centrally at right angles, and having a central bore flaring at each end and a tapering split bush and bolts for clamping or tightening together the bush-sections and thus securing the pulley-sections to each other, substantially as herein set forth.

4. A wood split pulley constructed as shown and having a bore flaring at each end, a tapering split bush having grooves for receiving the tightening-bolts, and the bolts for tightening together the bush-sections, substantially as herein set forth.

In testimony that I claim the foregoing I have hereunto set my hand, this 18th day of November, 1887, in the presence of two witnesses.

WILLIAM R. FEE.

Witnesses:
J. S. ZERBE,
O. J. BAILEY.